United States Patent [19]

Hambric

[11] Patent Number: 4,648,768

[45] Date of Patent: Mar. 10, 1987

[54] LOCKNUT ASSEMBLY FOR HIGH-SPEED ROTARY COMPONENTS

[76] Inventor: James C. Hambric, 2894 Florida Ave., Wellsville, N.Y. 14895

[21] Appl. No.: 610,464

[22] Filed: May 15, 1984

[51] Int. Cl.$^4$ .......................... F16B 39/06; B63H 1/28
[52] U.S. Cl. ..................................... 411/217; 411/220; 416/244 B
[58] Field of Search ............... 411/217, 220, 221, 351, 411/352, 357–359, 513, 515, 516, 530, 522; 403/320, 356; 416/244 B, 245 A, 247 A

[56] References Cited

U.S. PATENT DOCUMENTS

| | | | |
|---|---|---|---|
| 1,246,689 | 11/1917 | Wilkinson | 411/220 |
| 1,390,775 | 9/1921 | Fritz | 411/220 |
| 2,794,474 | 6/1957 | Stukenborg | 411/217 |
| 3,061,342 | 10/1962 | Feller | 416/244 B |
| 3,064,773 | 11/1962 | Linecker | 411/217 |
| 3,851,690 | 12/1974 | Wing et al. | 411/220 |

Primary Examiner—Thomas S. Holko
Assistant Examiner—Neill Wilson
Attorney, Agent, or Firm—Dowell & Dowell

[57] ABSTRACT

A lock assembly for securing nuts to rotatably driven shafts in which a generally U-shaped locking spring is mounted with one leg thereof disposed along an opening in the rotatably drive shaft or a component keyed to the shaft and the other leg thereof disposed through and beyond a hole in the nut with a tab portion of such leg extending perpendicularly of the hole so that the tab will be urged outwardly of the hole by centrifugal force as the drive shaft is rotated to thereby create a more secure engagement of the locking spring with the nut.

12 Claims, 5 Drawing Figures

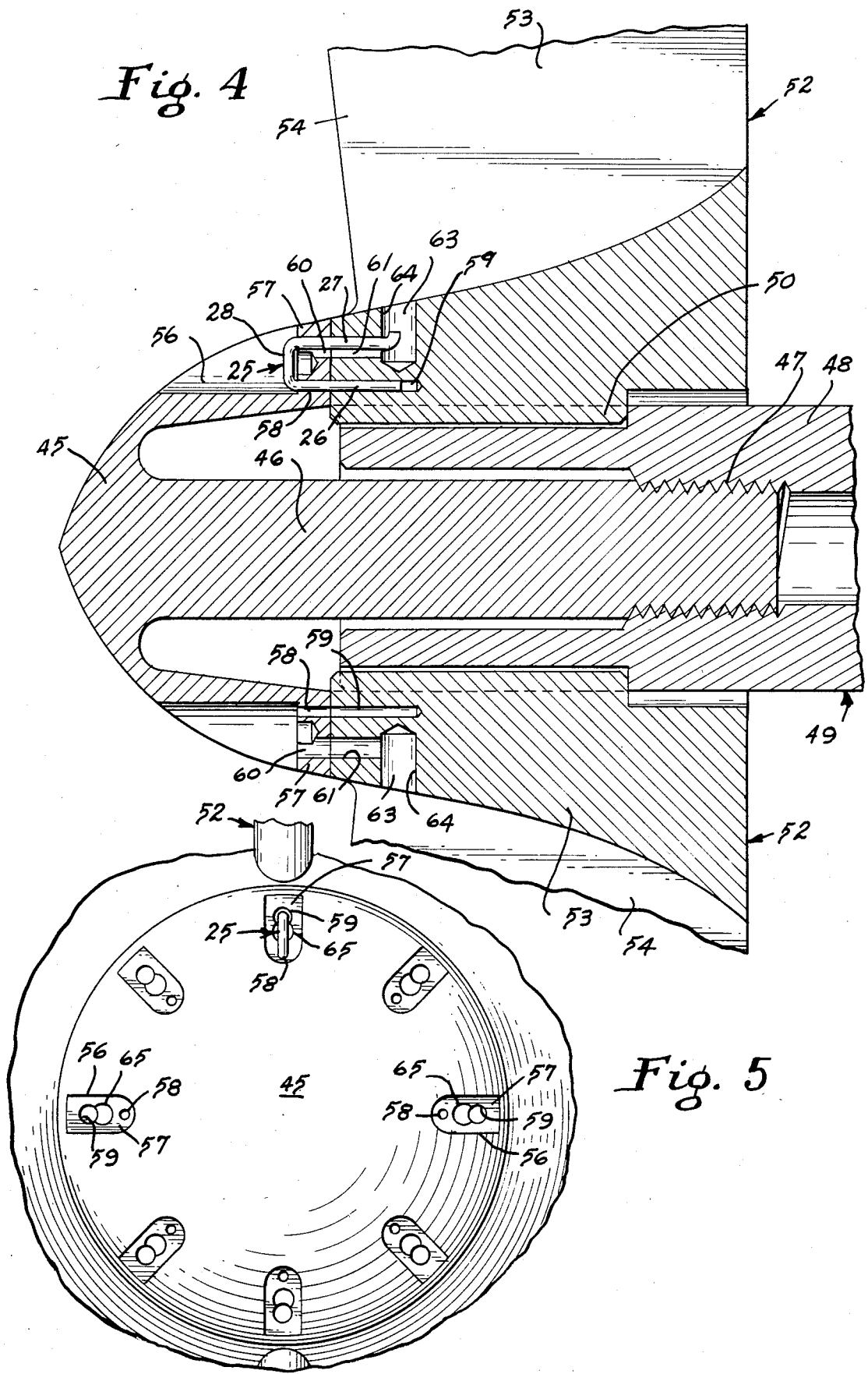

LOCKNUT ASSEMBLY FOR HIGH-SPEED ROTARY COMPONENTS

BACKGROUND OF THE INVENTION

1. Subject of the Invention

This invention is generally directed to locks for retaining threaded nuts in secure engagement with threaded shafts and particularly to a locknut assembly for use with rotating shafts and components attached thereto wherein a spring locking member secures a locknut in fixed relationship to the shaft and which locking member exhibits a greater resistance to removal or slippage as portions thereof are continuously urged into locking engagement with the nut by centrifugal force as the shaft is rotated.

2. History of the Prior Art

Heretofore there has been a great deal of effort directed to provide locking means for securing nuts to the threaded ends of bolts and other structural members. In most prior art locknut assemblies, the locking means is generally provided by a wire or sheet metal member which is used to cooperatively engage both the nut and the shaft of a bolt upon which the nut is mounted. Although some locking members are the type which may deform the threads between the nut and the bolt many other prior devices do provide means for receiving the locking components by providing grooves along the length of the threaded portion of the bolt.

Examples of prior art locking devices which incorporate locking means which are receivable in grooves formed in the threaded ends of a bolt are U.S. Pat. Nos. 527,390 to Johnson; 753,301 to Obiols; 859,789 to Vaughn; 1,032,121 to Deuchler; 893,066 to Fletcher et al.; 287,003 to Cranford; 1,299,794 to Sheldon; and 348,117 to Ferber. In each of the foregoing references, a locking member such as a piece of sheet metal or wire has a portion thereof extending into an opening provided in the nut. The opening in the nut may in some cases be provided along the inner threaded portions such as shown in Fletcher, or may be made by forming a passage longitudinally with respect to the axis of the bolt through the nut as shown in Cranford. Each of the foregoing applications, however, is designed to retain the nut to a threaded portion of a bolt under generally static conditions, that is, in conditions where the bolt itself will not be subject to high-speed rotation or vibration which can cause an extremely high stress on the locked components.

In the field of turbo dynamics there is a need to insure that the components of a system are retained in proper engagement even where such parts undergo intense rotational movement such as in high-speed turbines. In addition, the locking means used must be sufficiently lightweight so that there will be no adverse affects on the rotating parts of the system to which the lock is attached. Such locks must also be strong enough to prevent movement of components, such as nuts, relative to other components, such as threaded shafts, under conditions where the centrifugal forces exerted on the elements of the lock are extremely intense. In the aforementioned prior art structures, the locking members or springs are not designed to counteract the forces created by rotation of the locked parts. With many of the prior art structures, the centrifugal force exerted on the locking member will cause a portion thereof to actually bring the lock out of engagement with the locked elements thereby making it possible for the locking member to be vibrated free of engagement therewith. In addition to the foregoing, vibration alone could act on other of the prior art structures discussed above wherein no means is provided for preventing the withdrawal of the locking member from its engagement between the locknut and the bolt or threaded shaft to which it is engaged.

Some prior art references, such as U.S. Pat. No. 883,691 to Baughman, do disclose locking means for securing a nut to a threaded shaft where a threaded shaft will be set in rotational movement during use. In Baughman, however, a spring element having a V-shaped beveled portion is shown as being receivable within a notch in the inner surface of the nut. The beveled portion permits a relative sliding movement of the locking member with respect to the nut where sufficient vibration is imparted to the locked assembly, and, therefore, a screw plug is placed through the locking member and into the rotating member in order to insure that the locking member is secured in place.

SUMMARY OF THE INVENTION

This invention is directed to a locking assembly for securing nuts to rotatably driven shafts such as those used in turbines, driveshafts, transmissions, and other machinery. The locking assembly includes a generally U-shaped locking spring wire which has generally diverging legs which are normally urged away from one another by the characteristics of the material from which the locking spring is made. An outwardly extending tab is integrally formed at the end of one of the legs of the spring in order to prevent the locking spring from slipping from engagement with the locknut. One leg of the spring is urged into an opening formed longitudinally along the threaded shaft or into a component rotatably driven thereby while the other leg of the spring lock having the tab thereon is urged through a hole which extends through the nut so that the tab is urged outwardly of the opening along the underside of the nut. If necessary, a plurality of longitudinal openings may be formed in the shaft member or associated member and a plurality of holes provided through the nut so that additional spring locks may be used or so that locking alignment is more easily obtained. In addition, a channel may be made in the upper surface of the nut in order to permit conventional tools to be used to assist in removing the spring lock from engagement with the locknut.

It is the primary object of this invention to provide a spring lock for securing nuts or other threaded members in a threaded engagement with a rotating shaft wherein the rotation of the shaft causes the lock to expand into increasingly greater contact with the nut to thereby insure that the nut will not be loosened with respect to the threads of the shaft during rotation of the shaft.

It is another object of this invention to provide a lock for use in securing nuts or other threaded members on rotating shafts wherein the lock is expanded by centrifugal energy as the shaft is rotated but which can be selectively collapsed to permit removal of the lock when the shaft is stationary.

It is yet another object of the present invention to provide a relatively small, lightweight, and inexpensive generally U-shaped spring lock for use in securing a threaded member to a rotating shaft where the lock is easily installed by inserting one portion thereof along a groove formed longitudinally of the shaft and between the shaft and threaded member while simultaneously inserting another portion thereof through an opening which extends through the threaded member and generally parallel to the groove in the shaft and thereafter permitting the spring to expand into a locking engagement with the threaded member.

It is another object of the present invention to provide a spring lock for retaining rotating components in tightly threading engagement with one another where the lock is provided with an extremity which causes the lock to be expanded upon rotation of the rotating components thereby forcing such extremity constant outwardly and thereby preventing any longitudinal release of the lock from the rotating components.

In another embodiment of the invention, it is an object to provide a lightweight spring lock to secure a nut having a threaded shaft to a rotating drive shaft in which one portion of the lock is disposed within an opening in a member which is drivingly secured to the drive shaft and in which another portion of the lock extends through the nut with the end of such portion extending generally perpendicularly to the opening through the nut.

It is a further object of this invention to provide a locking spring which can be used in rotary machinery to securely lock impellors, turbine wheels, gears and the like to high-speed drive shafts where severe centrifugal forces are exerted on the locking spring.

BRIEF DESCRIPTION OF THE DRAWINGS

FIG. 4 is a partial cross-sectional view illustrating the use of the spring lock of the present invention to secure a hub or nut having internally wrenching threads to a drive shaft which is drivingly connected to an impellor element.

FIG. 5 is a cross-sectional view taken along lines 5—5 of FIG. 4.

DESCRIPTION OF THE PREFERRED EMBODIMENT

Figure 1:
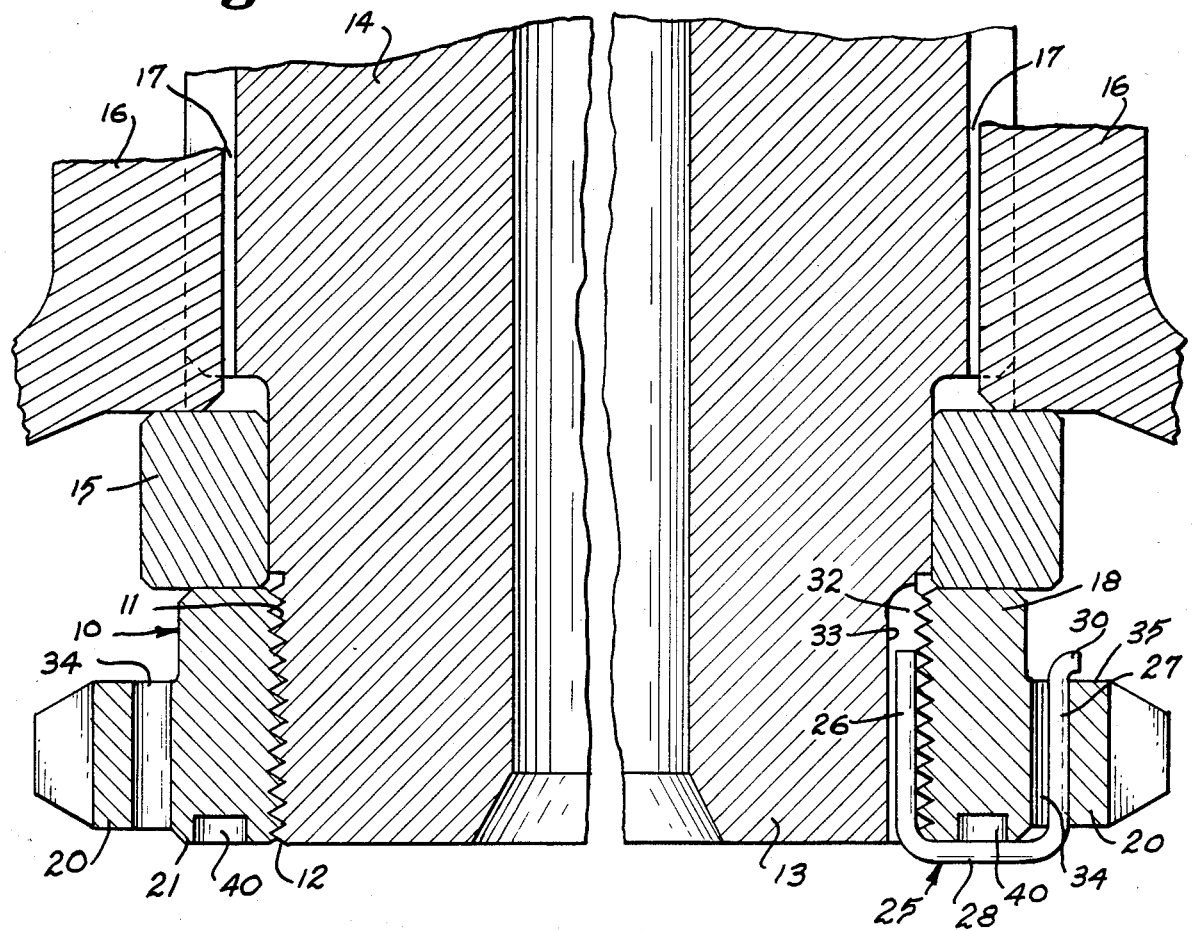
FIG. 1 is a cross-sectional view illustrating the locking assembly of the present invention as it is used to secure a nut to a rotatable drive shaft.
Figure 3:
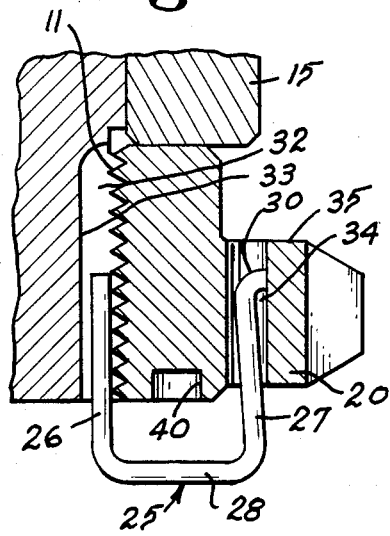
FIG. 3 is a segmented cross-sectional view illustrating the locking spring of the present invention as it is being inserted through an opening in a locking nut and a slot in a drive shaft.
Figure 2:
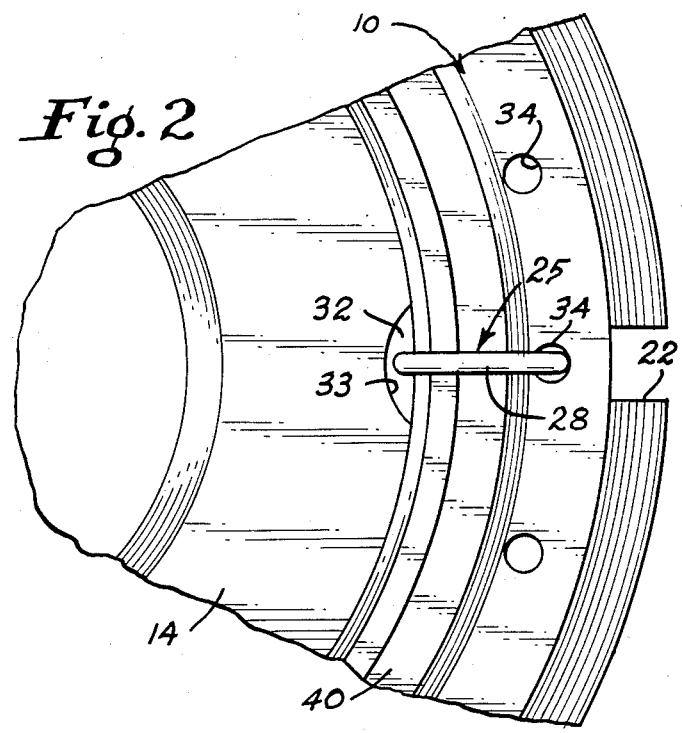
FIG. 2 is a partial or segmented front plan view showing the locking spring of the present invention.

With particular reference to FIGS. 1 through 3, a locknut 10 is shown as being threadingly engaged at 11 to the external threads 12 formed along the end portion 13 of a rotatable drive or power output shaft 14. As shown in FIG. 1, the locknut 10 is tightened into abutting engagement with a washer element 15 which in turn abuts a driven element 16 which is keyed by interlocking splines at 17 to the drive shaft 14.

The locknut includes a generally cylindrical portion 18 having a plurality of screw threads 11 cut on the inner surface thereof. A flange 20 extends outwardly of the cylindrical portion adjacent the outer face 21 of the nut 10. The flange 20 of the nut may include a plurality of slots 22 formed on the outer edge thereof for purposes of receiving a wrenching element or tool for driving or rotating the nut with respect to the threads 12 at the end 13 of the drive shaft.

The nut 10 is maintained in tightly threaded engagement with the drive shaft and properly abutting the washer element 15 by a resilient or spring locking element 25. The locking spring element prevents any relative movement between the nut and the threaded end of the drive shaft. As shown in FIGS. 1 and 3, the spring locking element is generally U-shaped being formed of a continuous wire material having a generally circular cross section. The U-shaped locking element includes an inner leg portion 26 and an outer leg portion 27 which are connected by an intermediate portion 28. Due to the spring like characteristics of the locking element, the inner and outer leg portions are continuously being urged apart with respect to one another although they are shown as extending in generally parallel relationship when in an assembled or mounted position as shown in FIG. 1. To insure that the spring locking element 25 is retained in engaged position with the locknut 10 an outwardly extending tab or extension member 30 is integrally formed at the end of the outer leg portion 27 so as to extend generally perpendicularly with respect thereto. The purpose of the outwardly extending tab portion will be described in greater detail hereinafter.

In order to permit the inner leg portion 26 of the spring locking element 25 to be received between the cylindrical portion 18 of the nut 10 and the outer end 13 of the drive shaft 14, at least one longitudinally extending slot 32 is cut or otherwise formed along the threaded end portion 12 thereof. The slot 32 should have a depth generally equal to or just slightly greater than the diameter of the inner leg portion of the locking spring member so that the inner leg portion of the locking spring elements may be selectively inserted within the slot and between the threads of the locknut and the bottom 33 of the slot after the locknut has been tightly threaded to the end of the output shaft. To secure the outer leg portion 27 of the locking spring element to the locknut, a number of equally spaced holes 34 are drilled through the outer flange 20 of the locknut with such holes extending parallel to the slots 32 cut in the drive shaft 14. As shown in FIG. 3, the holes 34 have a diameter of a size to permit the second leg portion of the spring locking element to be inserted therethrough and, therefore, are of a size to permit the tab 20 formed at the end of the outer leg portion to pass therethrough.

The length of the inner and outer leg portions of the spring locking element 25 are generally equal and are of sufficient dimension to insure that the tab 30 on the outer leg portion 27 is completely extended through the hole 34 in the outer flange of the locknut 10 when the intermediate portion 28 of the spring locking element is engaged with the outer face 21 of the locknut. In this manner, the tab portion 30 formed at the end of the outer leg member will extend outwardly and generally along the inner face 35 of the radial flange of the locknut.

In use, the spring locking element 25 is inserted so that the inner leg portion 26 passes along the slot 32 while the outer leg portion 27 passes through a hole 34 in the locknut 10 until the intermediate portion 28 of the locking spring engages the outer face 21 of the locknut. After the spring locking element has been inserted in place, any rotational movement of the drive shaft 14 will cause the outer leg portion 27 of the locking spring to be urged outwardly by centrifugal force thereby insuring that the tab portion 30 thereof remains in position adjacent the inner surface 35 of the locknut. The mass of the tab portion itself will further cause the outer leg portion of the spring locking element to be urged outwardly against the surfaces defining the opening 34 through the locknut as the drive shaft 14 is rotated. With particular reference to FIG. 2, the inner leg portion 26 of the spring locking element prevents any relative rotational movement between the drive shaft 14 and the locknut 10 as this leg portion will bind against the walls defining the slot 32 and the threads 11 of the locknut.

Although a single spring locking element is shown in FIGS. 1 through 3, a plurality of equally spaced locking elements could be used to secure the nut to the rotatable shaft. In such event the slots 32 formed in the end of the drive shaft should be equally spaced and oriented symmetrically so as not to cause any weight imbalance on the drive shaft. In a similar manner, the openings or holes 34 through the flange of the locknut should also be equally and symmetrically spaced. By way of example, for drive shaft diameters ranging between approximately three to eight inches a spring locking member may be preferably formed of a generally circular cross-sectional metal wire such as a music wire having a diameter of approximately 0.06 inches. The diameter of the locking member may be reduced for smaller diameter shafts even though such shafts may be operated at speeds of 100,000 R.P.M. The length of the inner and outer leg portions of the locking spring will, of course, be determined by the width or depth of the flange of the locknut.

In order to remove the locking spring element from engagement with the locknut and drive shaft, it is merely necessary to take a tool such as a screwdriver and urge the tab portion 30 of the locking spring element inwardly toward the first leg portion thereof while exerting a pulling force on the intermediate portion 28 of the locking spring element thereby sliding the first and second leg portions from the slot 32 and hole 34. To facilitate the removal of the locking spring, a generally annular groove 40 may be provided in the outer face of the locknut. As shown in the mounted position, the intermediate portion 28 of the locking spring 25 will extend across the annular groove 40. The annular groove will permit pliers or similar tools to be used to engage the intermediate portion of the locking spring and thereby gain a mechanical advantage in pulling the locking spring from its seated engagement with the locked components.

Another embodiment of the invention is shown in FIGS. 4 and 5. In this embodiment of the invention the spring locking element 25 is shown in use with a locking hub or locknut 45 wherein the nut includes a bolt like shaft 46 having a threaded end portion 47 which is engageable by an interiorly threaded end portion 48 of an impellor or turbine drive shaft element 49. As shown in FIG. 4, the drive shaft 49 is connected by inter meshing splines 50 with an impellor or similar member 52 so that the impellor is rotated by the drive shaft 49. In this embodiment of the invention, the spring locking element is used to insure that the locking hub or nut 45 is maintained in secure engagement with the drive shaft 49 by locking the locknut with the impellor 52 which is keyed by the splines 50 to the drive shaft.

The impellor 52 generally includes a hub portion 53 from which extend a number of radially extending blades 54. In order to permit the locking spring to be received and engage both the locknut 45 and hub 53 of the impellor 52, at least one cutout or slot 56 is provided in the periphery of the locknut. The slot 56 forms an end wall 57 against which the intermediate portion 28 of the spring locking element will abut itself when the spring locking element is in an installed position. The generally flat end wall 57 of the locking hub extends generally perpendicularly to the central axis of the drive shaft.

A first or lower opening 58 is drilled through the end wall 57 and such opening aligns with another drilled opening 59 which is longitudinally made into the hub of the impellor assembly. The diameter of the openings 58 and 59 are substantially the same and are just slightly larger than the diameter of the first leg portion 26 of the spring locking element.

A second or outer set of openings are made through the end wall 57 and into the hub of the impellor assembly as shown at 60 and 61. Such outer openings are generally aligned with one another and extend parallel with respect to openings 58 and 59. The diameter of the outer openings 60 and 61 is sufficient to permit the second leg portion of the locking member to be inserted therethrough and, therefore, of a size to permit the passage of the tab portion therethrough. In order to permit the spring locking element to expand after being inserted through the openings and to provide a surface against which the tab of the spring locking element may be engaged, a hole 63 is drilled in the hub so as to extend radially of the central axis of the drive shaft. The hole 63 intersects the central axis of the openings 60 and 61. In this manner, an abutment surface 64 is provided along a portion of the opening 63 which serves to restrict the tab portion 30 of the spring locking element from being withdrawn from its locked position within the impellor assembly. The opening 63 also permits a tool to be inserted therein to urge the outer leg portion 27 of the spring locking element 25 toward the first leg portion 26 to allow the removal of the locking element from the locknut 45 and the impellor assembly 52.

To further facilitate the removal of the spring locking element, a recess or opening 65 may be countersunk in the end wall 57 at a point where the intermediate portion of the locking member will extend there across when the locking member is in engagement with the wall 57. The countersunk area 65 will permit the end of a pair of pliers or similar tools to pass on either side of the intermediate portion of the locking element to thereby gain a mechanical advantage when urging the locking member from the aligned openings in the hub assembly 52.

As with the preferred embodiment of the invention, more than one spring locking member may be used to secure the locknut 45 to the impellor assembly 52. If additional locking elements are to be used, the additional openings formed in the locknut and the hub of the impellor assembly should be symmetrically oriented to insure that the impellor is properly balanced so as not to adversely affect the rotational movement of the system. With respect to the use of the second embodiment, as the drive shaft rotates the impellor assembly 52 and locknut 45, the spring locking element will be rotated about the central axis of the drive shaft. This rotational movement of the locking element will cause the first leg portion thereof to bind against the walls of the openings 58 and 59 while simultaneously urging the outer leg portion thereof outwardly with respect to the central axis of the drive shaft and against the upper or outermost walls of the openings 60 and 61. Therefore, the action created by the rotation of the drive shaft will insure that the spring locking element will remain engaged in a securely seated position by action of centrifugal force. Again, the right angle tab portion 30 of the spring locking element will prevent the element from being vibrated from its seated position within the openings in the locknut and hub of the impellor assembly.

I claim:

1. In a locknut assembly for retaining a nut in securely threaded engagement with a rotatably driven element in which a first opening is provided in the rotatably driven element so as to extend generally parallel to the axis of rotation thereof and a second opening is formed through the nut so as to extend generally parallel to and remotely spaced from the first opening in the rotatable element the improvement comprising a generally U-shaped metallic locking spring means having first and second leg portions of substantially equal length and having generally uniform circular cross sections, said leg portions having first and second ends, said first ends of said leg portions being connected by an intermediate portion so that said first and second leg portions normally resist movement toward one another, a tab means extending from the second end of said second leg portion and extending generally perpendicular thereto, said first leg portion of said spring means being selectively receivable within the first opening in said rotatably driven element and said second leg portion of said spring means having a length to permit said second leg portion to extend completely through the nut, said tab means extending generally perpendicularly outwardly with respect to the second opening and the axis of rotation of the rotatably driven element and being of a size to pass through said second opening without being deflected, whereby when the rotatably driven element and the nut are rotated about the axis of rotation said tab means will be extended generally perpendicularly with respect to the second opening so as to prevent withdrawal of said spring means from the first and second openings in the rotatably driven element and nut respectively.

2. A locknut assembly for rotating equipment comprising a nut means having a threaded portion and a body portion, a rotating driven element which rotates about an axis, said rotatably driven element having a threaded section for cooperatively engaging said threaded portion of said nut means so that said nut means is generally axially aligned with said rotatably driven element, at least one of a first opening in said rotatably driven element and extending longitudinally with respect to said axis, at least one of a second opening extending through said body portion of said nut means and in spaced relationship from said rotatably driven element, a generally U-shaped integrally formed locking spring means having first and second leg portions, said leg portions having first and second ends, said first ends of said leg portions being connected by an intermediate portion so that said first and second leg portions normally resist movement toward one another, a tab means extending from said second end of said second leg portion and extending generally perpendicularly thereto, said first leg portion of said spring means being selectively receivable within said first opening in said rotatably driven element and said second leg portion of said spring means being selectively receivable within said second opening of said nut means and said second opening being of a size to permit said second leg portion and said tab means to pass therethrough without deflecting said tab means with respect to said second leg portion, said second leg portion of said spring means having a length to permit said second leg portion to extend completely through said nut means, said tab means extending radially outwardly with respect to said second opening and said axis whereby when said rotatably driven element and said nut means are rotated about said axis said tab means will be extended generally perpendicularly with respect to said second opening by cenrrifugal force so as to prevent withdrawal of said spring means from said first and second openings.

3. The locknut assembly of claim 2 in which said first and second openings are oriented in generally parallel relationship with the axis of rotation of said rotatable element.

4. The locknut assembly of claim 3 in which said U-shaped integrally formed locking spring means is formed from a metal wire having a generally uniform circular cross section.

5. A locknut assembly of claim 4 in which the diameter of said U-shaped integrally formed locking spring means is generally not greater than approximately 0.06 inches.

6. The locknut assembly of claim 3 in which said first and second leg portions of said locking spring means are substantially equal length.

7. The locknut assembly of claim 6 in which said body portion of said nut means includes an exterior face portion, said intermediate portion of said spring locking means normally engaging said face portion of said nut means when said first and second leg portions are received within first and second openings respectively, a recess formed in said face portion of said nut means so as to be positioned between said first and second openings in said rotatably driven element and said nut means respectively, said intermediate portion of said locking spring means extending across said recessed opening so as to be spaced above said opening.

8. The invention of claim 6 including a plurality of first and second openings in equally spaced symmetrically relationship in said rotatable element and said nut means respectively, a plurality of generally U-shaped integrally formed locking spring means, said spring means being selectively received in said plurality of first and second openings.

9. The locknut assembly of claim 2 in which said rotatably driven element includes a drive shaft having a threaded end portion, said nut means being threadingly engageable with said threaded end portion of said drive shaft, said first opening in said rotatably driven element being formed as a groove extending longitudinally along said threaded and portion of said drive shaft, said U-shaped locking spring means being formed of a metal wire having a generally circular cross section, said groove having a depth substantially equal to the diameter of said wire, said second opening through said nut means extending generally parallel with said groove, said second opening having a diameter substantially equal to the combined dimension of the diameter of said wire and the length of said tab means whereby said tab means may be slideably passed through said second opening.

10. A locknut assembly for rotating equipment comprising a nut means having a threaded portion and a body portion, a rotating driven element which rotates about an axis, said rotatably driven element having a threaded section for cooperatively engaging said threaded portion of said nut means so that said nut means is generally axially aligned with said rotatably driven element, at least one of a first opening in said rotatably driven element and extending longitudinally with respect to said axis, at least one of a second opening through said body portion of said nut means, a generally U-shaped integrally formed locking spring means having first and second leg portions, said leg portions having first and second ends, said first ends of said leg portions being connected by an intermediate portion so that said first and second leg portions normally resist movement toward one another, a tab means extending from said second end of said second leg portion and extending generally perpendicularly thereto, said rotatably driven element including an impellor means, said impellor means being driven by a rotating drive shaft, said impellor means having a hub portion, said first opening extending into said hub portion of said impellor means, a third opening formed in said hub portion of said impellor means and extending generally parallel to said first opening therein, said third opening being radially spaced outwardly of said first opening with respect to said axis so as to be cooperatively aligned with said second opening in said nut means, a fourth opening in said nut means, said fourth opening being generally aligned with said first opening in said hub portion of said impellor means, said first leg portion of said locking spring means being selectively receivable within said first and fourth openings in said hub means and said nut means respectively, said second leg portion of said locking spring means being selectively received within siad second opening and said third opening in said nut means and said impellor means respectively, and a fifth opening in said hub portion of said impellor means extending from an open communication with and generally perpendicular to said third opening in said hub portion so as to extend generally perpendicular to said axis, said tab means of said second leg portion of said locking spring means being selectively receivable within said fifth opening in said hub means.

11. The locknut assembly of claim 10 in which said nut means includes a plurality of cutout portions generally equally and symmetrically spaced around the periphery of the body portion thereof, each of said cutout portions defining an abutment wall which extends generally perpendicularly with respect to and intersects said second opening and said fourth opening in said nut means, said abutment wall being engageable by said intermediate portion of said locking spring means when said locking spring means is engaged within said openings within said hub portion of said impellor means and said nut means.

12. The invention of claim 11 including a recess formed in said abutment wall of said cutout portions and between said second and fourth openings through said nut means, said intermediate portion of said spring locking means extending across said recess.

* * * * *